United States Patent [19]

Nietert

[11] Patent Number: 4,842,419
[45] Date of Patent: Jun. 27, 1989

[54] COMBINATION TEMPERATURE SENSOR AND SWITCH ASSEMBLY

[75] Inventor: James E. Nietert, Grand Blanc, Mich.

[73] Assignee: General Motors Corporation, Detroit, Mich.

[21] Appl. No.: 202,360

[22] Filed: Jun. 6, 1988

[51] Int. Cl.$^4$ .................. G01K 1/14; G01K 13/00
[52] U.S. Cl. ..................... 374/145; 374/185; 374/208; 374/163; 337/3; 337/107
[58] Field of Search ......... 374/144, 163, 183, 205, 374/145, 165, 185, 208; 123/41.15; 337/3, 107, 113; 338/28; 340/57

[56] References Cited

U.S. PATENT DOCUMENTS

| | | | |
|---|---|---|---|
| 2,391,992 | 1/1946 | Malone | 374/144 |
| 3,044,296 | 7/1962 | Boddy | 374/145 |
| 3,701,068 | 10/1972 | Johnsen | 337/113 |
| 3,735,310 | 5/1973 | Kochanski | 337/107 |
| 3,886,912 | 6/1975 | Haglund | 123/8.47 |
| 3,890,588 | 6/1975 | Kanaya et al. | 338/28 |
| 4,037,316 | 7/1977 | Stoll | 337/107 |
| 4,299,117 | 11/1981 | Andrews et al. | 374/145 |
| 4,306,210 | 12/1981 | Saur | 337/107 |
| 4,548,780 | 10/1985 | Krohn | 264/272.15 |

FOREIGN PATENT DOCUMENTS

| | | | |
|---|---|---|---|
| 2907807 | 9/1980 | Fed. Rep. of Germany | 337/3 |
| 2425968 | 12/1975 | Japan | 374/185 |
| 0091425 | 6/1982 | Japan | 374/163 |
| 0028629 | 2/1987 | Japan | 374/163 |
| 2083231 | 3/1982 | United Kingdom | 374/144 |

Primary Examiner—William A. Cuchlinski, Jr.
Assistant Examiner—Thomas B. Will
Attorney, Agent, or Firm—Robert M. Sigler

[57] ABSTRACT

A sensing device for monitoring engine coolant temperature comprises a two leaded thermistor, a single lead thermistor and a single lead bimetal switch in a compact shell. The switch and one thermistor are electrically grounded to the shell. A bimetal leaf is welded to the end of the shell and its free end extends to an adjustable central contact. A spring assembly biases the grounded thermistor against a shelf near the end of the shell. The leaf and the spring assembly are canted at an angle to conserve space. The other thermistor is supported by an insulated closure in one end of the shell.

5 Claims, 1 Drawing Sheet

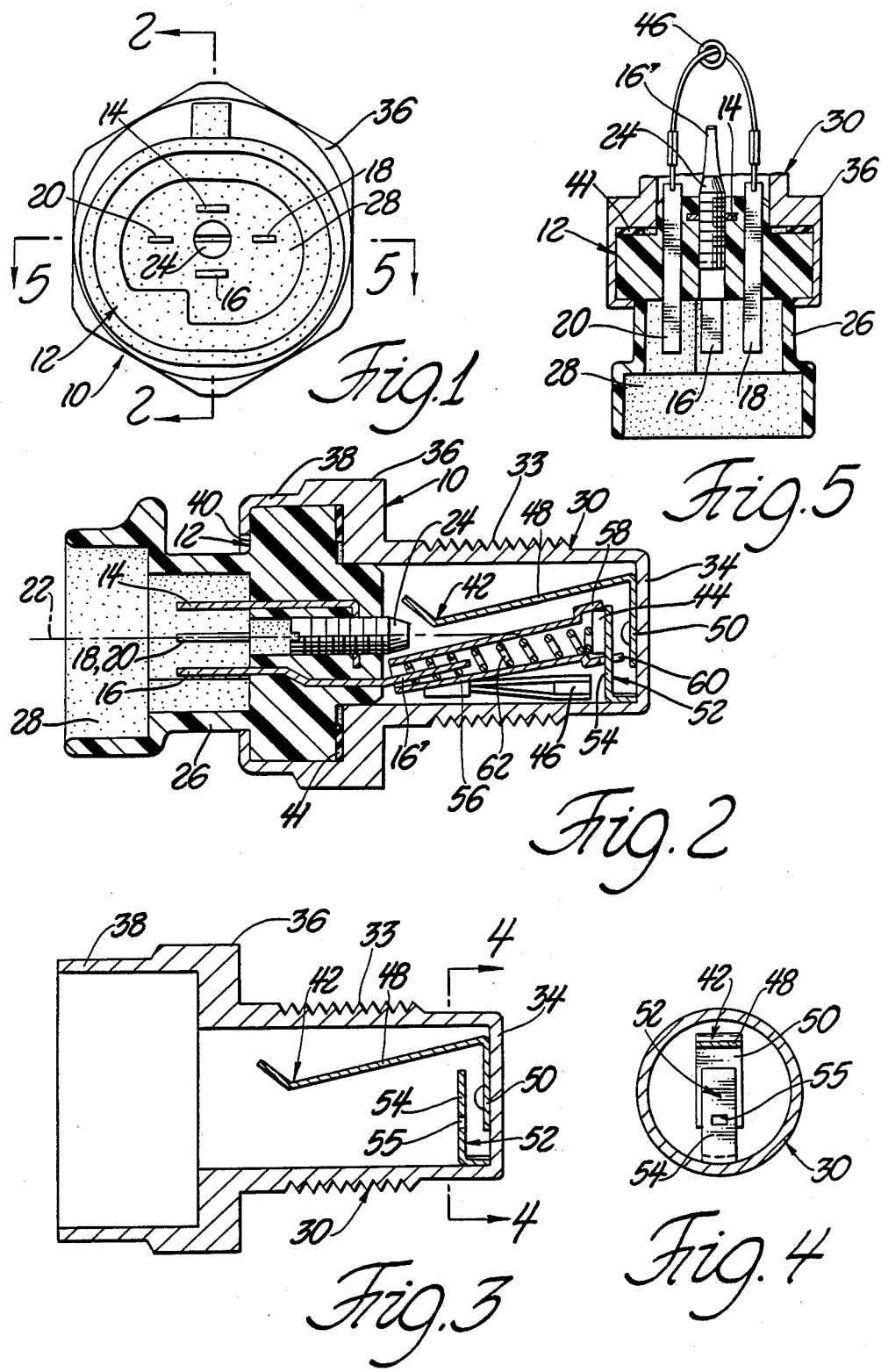

COMBINATION TEMPERATURE SENSOR AND SWITCH ASSEMBLY

FIELD OF THE INVENTION

This invention relates to a combination temperature sensor and temperature switch assembly and particularly to such an assembly of the type used to detect engine coolant temperature.

BACKGROUND OF THE INVENTION

The control of automotive engines and the display panels of vehicles require information on the temperature of the engine coolant. Different types of information and different types of electrical signals carrying the information are dictated by the specific uses. Separate sensing devices are commonly mounted on an engine to gather the required data. This requires a hole to be drilled in the engine block and tapped for each device. Aside from the expense of machining the holes, there are expenses involved in wiring harness arrangements to serve each device. Another problem is the lack of room to mount all the needed hardware on an engine. It is proposed, then, to solve the problems by reducing the devices in size or by combining the functions of several devices in one part. This has the advantages of only one hole to machine in the engine block, only one part to maintain in inventory, only one part to install, only one wiring harness to be used and lower price per function.

It has been known to combine a temperature switch and a thermistor in one package, both being grounded through the case so that two terminals are used to provide signals to the hot temperature light and to the analog gage, both on the instrument panel. It is desirable however to include temperature measurement by another thermistor for closed loop fuel control by an electronic control module. Since the thermistors are heat generators the design is critical for a package containing multiple thermistors which yield accurate data.

SUMMARY OF THE INVENTION

It is therefore an object of the invention to provide an engine coolant sensing device having several sensing functions combined in one package.

The invention is carried out by an engine coolant temperature sensor and switch for supplying a plurality of temperature signals to external utilization devices comprising; temperature sensing units comprising a thermal switch and first and second thermal sensors, a thermally and electrically conductive housing having a container portion and an opening, an insulating closure secured in the opening of the housing, a plurality of terminals extending through the closure into the housing, the thermal switch having a temperature sensitive leaf secured at one end to the housing, the other end being movable to make and break contact with a first one of the terminals, means for mounting the first thermal sensor in thermal and electrical contact with the housing including means for connecting the thermal sensor to a second one of the terminals, and means for electrically and mechanically coupling the second thermal sensor to third and fourth ones of the terminals, whereby the three sensing units are compactly arranged in a single housing.

BRIEF DESCRIPTION OF THE DRAWINGS

The above and other advantages of the invention will become more apparent from the following description taken in conjunction with the accompanying drawings wherein like references refer to like parts and wherein:

FIG. 1 is an end view of a combination temperature sensing device according to the invention, FIG. 2 is a longitudinal cross sectional view of the device taken along lines 2—2 of FIG. 1, FIG. 3 is cross sectional view of the device housing of FIG. 1 with some of the internal parts assembled, FIG. 4 is a cross sectional view of the device taken along line 4—4 of FIG. 3, and FIG. 5 is a cross sectional view of the closure taken along lines 5—5 of FIG. 1.

DESCRIPTION OF THE PREFERRED EMBODIMENT

The combination temperature switch and temperature sensor described herein is specifically designed for use in an automotive vehicle and is adapted to be threadedly secured in a tapped opening in an engine block for direct exposure to the engine coolant. The device provides three functions: a switched output on one terminal to turn on an indicator light on the instrument panel when the coolant exceeds a preset temperature, a first analog output on one terminal to drive an analog gage on the instrument panel, and a second analog output on two terminals to furnish temperature information to an electronic engine control. The analog outputs are resistances which vary with temperature. Thermistors are used for providing the variable resistances but other devices might be substituted.

As shown in FIGS. 1 and 2, the outer components of the sensing device include a thermally and electrically conductive housing 10, a closure 12 of insulating material and terminals 14, 16, 18 and 20 which extend through the closure 12 into the housing 10. Preferably the housing is brass and the closure is glass filled nylon. The terminals are insert molded into the closure 12. The terminals are symmetrically arranged around the longitudinal axis 22 of the device. An adjustment screw 24 is a part of the first terminal 14 and is on the axis 22 with its slot head exposed to the outside until adjustment is completed whereupon it is covered with a protective material. The closure 12 extends outwardly in an oval shell 26 around the terminals and beyond to form a socket 28 with a stepped bore for coupling with an electrical connector. The housing 10 includes an elongated hollow cup or shell 30 having an externally threaded cylindrical side wall 33 closed by an end wall 34. The housing 10 is open at the end opposite the end wall 34 to receive the closure 12. The part of the housing surrounding the closure 12 comprises a hex nut portion 36 and a thin annular flange 38 which is crimped around a shoulder 40 on the closure 12. A gasket 41 between the closure and the housing provides a seal.

As best shown in FIGS. 2 through 5 the inner components of the device comprise a bimetal switch 42, two thermistors 44 and 46, and their mounting arrangement. The switch 42 includes the axial adjustable screw 24 which is the stationary contact and a bimetal leaf 48 which is the temperature sensitive movable contact. The leaf 48 terminates at one end in a foot portion 50 which is welded to the end wall 34 on the axis 22. The portion of the leaf which bridges the end wall 34 and the screw 24 lies at an acute angle to the axis 22.

The assembly for the thermistor 44 provides a connection at one side to the housing and at the other side to the terminal 16. An L-shaped bracket 52 has a short leg welded to the wall 33 so that the long leg extends over the foot 50 of the bimetal element and is slightly spaced therefrom to form a shelf 54 extending beyond the axis to provide a mounting surface for the thermistor 44 and contains a slot 55 adjacent the desired position of the thermistor 44. An insulating tube 56 formed of Mylar (TM) or cardboard has a bell mouth 58 or a section of enlarged radius at one end of sufficient size to encompass the thermistor 44 which is in the form of a pellet. A short tab 60 extends from the rim of the bell mouth in the longitudinal direction of the tube 56 and protrudes into the slot 55 in the shelf to positively locate the tube end. The tube lies at an acute angle to the axis 22 and is generally parallel to the leaf 48. A coil spring 62 fits within the tube 56 and is compressed to bear against the thermistor 44 at one end and a long extension 16' of the terminal 16 at the other end. The extension 16', which is tapered as shown in FIG. 5 from a width greater than the diameter of spring 62 to a width less than the diameter of spring 62, enters into the coils of the spring 62 to positively locate that end of the spring. Thus electrical contact is made between the terminal 16 and one side of the thermistor 44 while thermal and electrical contact between the shelf 54 and the other side of the thermistor 44 are assured.

The second thermistor 46, as shown in FIGS. 2 and 5, has two wire leads connected to the two terminals 18 and 20. The thermistor 46 is positioned near the side of the housing opposite the leaf 48 and spaced slightly from the shelf 54. The thermistor 46 is electrically insulated from the housing but is thermally coupled to the housing by a silicon oxide thermal grease. In this manner the thermistor 46 follows the temperature of the housing to accurately and rapidly follow the housing temperature.

Since the thermistors generate heat as a result of applied current, care is taken in the design to protect the bimetal leaf 48 from the effects of that heat. By maintaining both thermistors in good thermal contact with the housing their temperature rise above the housing temperature is minimized. Radiation from the thermistors to the leaf 48 is minimized by the tube 56. Since the tube encompasses the thermistor 44 it forms a barrier to any such radiation. The thermistor 46 is judiciously positioned opposite the leaf 48 with the tube 56 intervening to guard against radiation from thermistor 46 to the leaf.

The compactness of the device is accomplished by the two tier structure provided by the shelf and also by the slant of the bimetal leaf 48 and the spring and tube assembly. The slant of the leaf provides space for the free end to move as temperature changes to make or break contact with the adjustable screw 24. The corresponding slant of the tube 56 prevents waste space between the tube and the leaf and it provides a suitable niche bounded by the shelf 54, the tube 56 and the housing 30 for the residence of the thermistor 46. This compactness results in the minimum housing size and corresponding bore size in the engine block for the sensing device.

The device is assembled by first welding the foot 50 of the bimetal element to the center of the end wall 34 and then welding the short leg of the shelf 54 to the side of the housing to reach the state shown in FIGS. 3 and 4. Then heat transfer grease is dispensed into the shell and the thermistor 44 with the tube 56 and spring assembly is inserted with the tab in the slot 55. The gasket 41 is assembled to the mouth of the shell and the closure assembly including the thermistor 46 is fit to the shell such that the thermistor 46 goes into its niche and the terminal end 16' enters the spring 62. The flange 38 of the housing is crimped around the shoulder of the closure to complete the assembly. After assembly the unit is calibrated by immersing the shell 30 into a bath of the desired switch closure temperature, applying the appropriate thermistor currents and a switch voltage, and adjusting the screw 24 to effect the desired switching performance. The screw head is coated with an epoxy-like material to serve as a seal and to maintain the screw adjustment.

It will thus be seen that the sensing device structure according to the invention provides a compact assembly of two thermistors and a bimetal switch which are thermally compatible and which can be produced at a low cost per function.

The embodiments of the invention in which an exclusive property or privilege is claimed are defined as follows:

1. An engine coolant temperature sensor and switch assembly for supplying a plurality of temperature signals to external utilization devices comprising;
    temperature sensing units comprising a thermal switch and first and second thermistors,
    a thermally and electrically conductive housing having a cup portion with an end wall, a cylindrical side wall defining a housing axis, and a coaxial opening opposite the end wall,
    an insulating closure secured in the opening of the housing,
    a plurality of terminals extending through the closure into the housing, one of the terminals having an adjustable screw contact movable within the housing and mounted on the housing axis whereby its position is insensitive to the closure orientation about the axis,
    the thermal switch having a temperature sensitive leaf secured at one end to the end wall on the housing axis, the other end extending toward the closure and being arranged to make and break contact with the adjustable screw contact,
    means for mounting the first thermistor in thermal and electrical contact with the housing including a shelf attached to the housing and spaced from the end wall for holding the first thermistor on the housing axis and spring means between the thermistor and the second one of the terminals for biasing the thermistor against the shelf for maintaining thermal contact with the shelf and for connecting the thermistor to the second one of the terminals, and means for electrically and mechanically coupling the second thermistor to third and fourth ones of the terminals,
    whereby the three sensing units are compactly arranged in the housing.

2. The invention as defined in claim 1 wherein the shelf includes a slot adjacent the first thermistor, and the means for mounting the first thermistor including a tubular insulator containing the spring means and the first thermistor, the insulator having a depending tab engaging the slot for maintaining the thermistor position on the shelf.

3. The invention as defined in claim 1 where the leaf has a portion extending at an acute angle to the axis from the end wall toward the screw contact, and the means for mounting the first thermistor including a tubular insulator containing the spring means and the first thermistor, the tubular insulator being slanted at an angle similar to the angle of the leaf portion, and the second thermistor resides between the housing and the insulator, whereby the elements are arranged for minimum space usage.

4. The invention as defined in claim 1 herein the leaf has a portion extending at an acute angle to the axis from the end wall toward the screw contact, the shelf includes a slot adjacent the first thermistor, and the means for mounting the first thermistor including a tubular insulator containing the spring means and the first thermistor, the tubular insulator being slanted at an angle similar to the angle of the leaf portion and having a depending tab engaging the slot for maintaining the thermistor position on the shelf.

5. The invention as defined in claim 1 wherein the leaf has a portion extending at an acute angle to the axis from the end wall toward the screw contact, the means for mounting the first thermistor including a tubular insulator containing the spring means and the first thermistor, the tubular insulator being slanted at an angle similar to the angle of the leaf portion, and the second thermistor resides between the housing and the insulator, the insulator being positioned for thermal protection of the leaf from the thermistors.

* * * * *